(12) United States Patent
Dickherber et al.

(10) Patent No.: US 11,335,917 B2
(45) Date of Patent: May 17, 2022

(54) LIGHTWEIGHT THERMAL BATTERY SYSTEM FOR HIGH-TEMPERATURE ENVIRONMENTS

(71) Applicant: Raytheon Company, Waltham, MA (US)

(72) Inventors: Dean Dickherber, Tucson, AZ (US); Matthew H. Summers, Marana, AZ (US); Gami D. Maislin, Arlington, MA (US); Brendon R. Holt, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 395 days.

(21) Appl. No.: 16/181,892

(22) Filed: Nov. 6, 2018

(65) Prior Publication Data

US 2020/0144631 A1    May 7, 2020

(51) Int. Cl.
*H01M 6/36* (2006.01)
*H01M 6/50* (2006.01)
*H01M 6/42* (2006.01)

(52) U.S. Cl.
CPC ........... *H01M 6/5088* (2013.01); *H01M 6/36* (2013.01); *H01M 6/42* (2013.01); *H01M 6/5038* (2013.01); *H01M 2220/20* (2013.01)

(58) Field of Classification Search
CPC ............................. H01M 6/5088; H01M 6/36
See application file for complete search history.

(56) References Cited

U.S. PATENT DOCUMENTS

| 4,158,084 A | 6/1979 | Prentice |
| 5,006,429 A | 4/1991 | Pracchia et al. |
| 5,206,456 A | 4/1993 | Pracchia et al. |
| 7,205,067 B2 * | 4/2007 | Godevais .......... H01M 10/0525 429/120 |
| 8,715,846 B1 | 5/2014 | Hoelscher et al. |

FOREIGN PATENT DOCUMENTS

| CN | 206210849 | * | 5/2017 |
| CN | 206210849 U | * | 5/2017 |
| CN | 108565526 | * | 9/2018 |
| CN | 108565526 A | * | 9/2018 |
| KR | 2014034413 | * | 3/2014 |
| KR | 2014034413 A | * | 3/2014 |

* cited by examiner

*Primary Examiner* — Ula C Ruddock
*Assistant Examiner* — Thomas H. Parsons

(57) ABSTRACT

An apparatus includes a thermal battery, which includes a housing and one or more battery cells within the housing. Each battery cell includes an anode, a cathode, and an electrolyte. The electrolyte in each battery cell is configured to be in a solid state when the battery cell is inactive. The apparatus also includes a phase change material around at least part of the housing. The phase change material is configured to conduct external heat into the housing in order to melt the electrolyte in each battery cell and activate the battery cell. The phase change material is also configured to change phase in order to reduce conduction of the external heat into the housing.

20 Claims, 4 Drawing Sheets

LIGHTWEIGHT THERMAL BATTERY SYSTEM FOR HIGH-TEMPERATURE ENVIRONMENTS

TECHNICAL FIELD

This disclosure generally relates to electrochemical battery power supplies. More specifically, this disclosure relates to a lightweight thermal battery system for high-temperature environments.

BACKGROUND

"Molten salt" batteries can be used in various types of systems to store or release electrical energy. In a typical molten salt battery, an electrolytic salt remains in a solid state at normal ambient temperature, so the battery remains inactive during this time. In order for the molten salt battery to be operable, at least the electrolytic salt is melted, allowing the transfer of ions between anode and cathode layers of the battery. The molten salt is thereby used as an electrolyte between the anode and cathode layers, allowing electrical energy to be stored in or released from the molten salt battery. Molten salt batteries have several advantages over typical solid-state batteries. For example, molten salt batteries can remain unused and stored for prolonged periods of time before being put into operation. Also, molten salt batteries typically have higher current densities and simplified manufacturing schemes compared to solid-state batteries.

SUMMARY

This disclosure provides a lightweight thermal battery system for high-temperature environments.

In a first embodiment, an apparatus includes a thermal battery, which includes a housing and one or more battery cells within the housing. Each battery cell includes an anode, a cathode, and an electrolyte. The electrolyte in each battery cell is configured to be in a solid state when the battery cell is inactive. The apparatus also includes a phase change material around at least part of the housing. The phase change material is configured to conduct external heat into the housing in order to melt the electrolyte in each battery cell and activate the battery cell. The phase change material is also configured to change phase in order to reduce conduction of the external heat into the housing.

In a second embodiment, a flight vehicle includes a body configured to generate heat. The flight vehicle also includes a thermal battery, which includes a housing and one or more battery cells within the housing. Each battery cell includes an anode, a cathode, and an electrolyte. The electrolyte in each battery cell is configured to be in a solid state when the battery cell is inactive. The flight vehicle further includes a phase change material around at least part of the housing. The phase change material is configured to conduct the heat from the body into the housing in order to melt the electrolyte in each battery cell and activate the battery cell. The phase change material is also configured to change phase in order to reduce conduction of the heat from the body into the housing.

In a third embodiment, a method includes conducting external heat through a phase change material into a thermal battery. The phase change material is positioned around at least part of a housing of the thermal battery. The thermal battery includes one or more battery cells within the housing. Each battery cell includes an anode, a cathode, and an electrolyte. The electrolyte in each battery cell is in a solid state when the battery cell is inactive. The method also includes melting the electrolyte in each battery cell using the external heat to activate the battery cell. The method further includes changing a phase of the phase change material in order to reduce conduction of the external heat into the housing after the one or more battery cells are activated.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
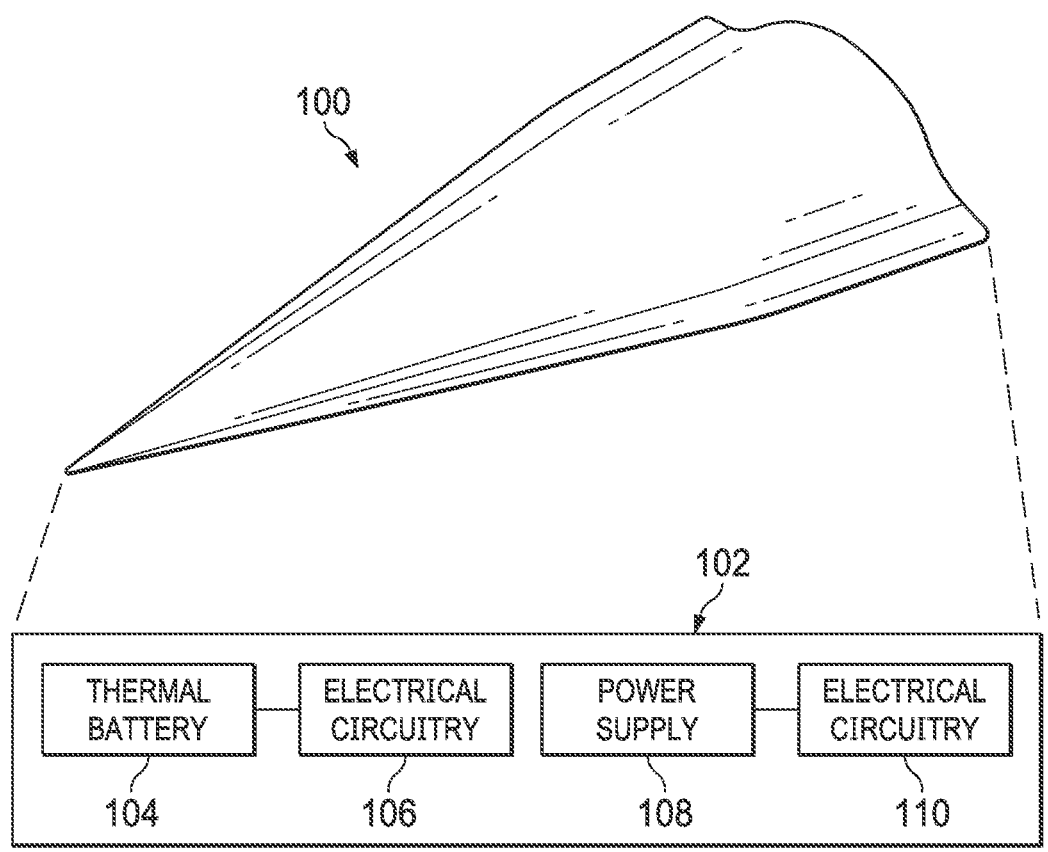
FIG. 1 illustrates an example flight vehicle in accordance with this disclosure.

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, molten salt batteries can be used in various types of systems to store and release electrical energy. Molten salt batteries represent one type of "thermal battery," which generally refers to a class of batteries in which thermal energy is used to melt at least an electrolyte and activate a battery. In a typical thermal battery, an electrolyte can remain in a solid state at normal ambient temperatures. To activate the thermal battery, at least the electrolyte is melted, and the melted electrolyte is positioned between anode and cathode layers of the battery. Depending on the implementation, the anode and cathode layers may or may not be formed using melted material. Once at least the electrolyte is melted, the battery can be used to store electrical energy or to release electrical energy.

In various thermal batteries, an igniter or other internal heat source is incorporated within the thermal battery itself, where the igniter or other heat source ignites heat pellets within the battery. The burning heat pellets then transfer heat into a solid electrolyte (and possibly into anode and cathode materials) in order to melt the materials and activate the thermal battery. However, the igniter or other heat source and the heat pellets increase the size, weight, and cost of the thermal battery itself and related components (such as a heat sink), as well as of the overall system in which the thermal battery is used. In some cases, the heat source and the heat pellets account for between 25% and 50% of the overall weight of a thermal battery.

This disclosure provides a lightweight thermal battery for high-temperature environments. As described in more detail below, a thermal battery is designed to be heated through conduction of external heat into the thermal battery. The external heat melts at least an electrolyte within the thermal battery and activates the thermal battery. Depending on the implementation, the external heat may or may not melt materials forming anode and cathode layers in the thermal battery in order to activate the thermal battery. In some embodiments, the external heat can represent heat generated through normal operation of a system, such as heat generated from aerodynamic drag on a flight vehicle. Thus, heat generated through the normal operation of the system can be used to activate the thermal battery, rather than requiring the use of a heat source and heat pellets. Also, a phase change material can be used in or with the thermal battery to conduct the external heat into the thermal battery. Once the phase change material reaches a threshold temperature or threshold temperature range, the phase change material can change phase and stop conducting heat into the thermal battery, such as by melting or otherwise moving away from the thermal battery.

In this way, an internal heat source and heat pellets can be omitted from a thermal battery, which reduces the size, weight, and cost of the thermal battery and of related components and systems. This can be particularly useful in flight vehicles or other systems having temperature-critical components or areas that can be sensitive to or affected by temperature but that have limited space and weight requirements. Moreover, the solid electrolyte in the thermal battery can be melted faster using conductive heat, decreasing the amount of time needed for the battery and its associated system to activate and become operational. In addition, the use of the phase change material helps to maintain the thermal battery within a specified temperature range. This can help to prevent over-heating of active materials in the thermal battery and keep the active materials within their safe operating temperature ranges.

FIG. 1 illustrates an example flight vehicle 100 in accordance with this disclosure. As shown in FIG. 1, the flight vehicle 100 generally represents an object that flies through, is launched through or into, or otherwise travels through a given space. The flight vehicle 100 can represent a vehicle that travels through an atmosphere or in space. In this particular example, the flight vehicle 100 represents a hypersonic vehicle, which typically refers to an object that can travel at a speed of at least Mach 5 (about 3,836 miles per hour or about 6,174 kilometers per hour). In such a hypersonic vehicle, friction caused by passage of the vehicle 100 through the atmosphere can generate large amounts of heat within the vehicle 100. As described in more detail below, a portion of this heat can be used to help power one or more components of the vehicle 100.

The flight vehicle 100 includes any suitable object configured to operate within a high-temperature environment. Example types of flight vehicles can include projectiles, rockets, missiles, drones, aircraft, satellites, and spacecraft. Note that the form factor of the flight vehicle 100 shown in FIG. 1 is for illustration only. A number of hypersonic vehicle designs have been proposed, and this disclosure is not limited to any specific design for a hypersonic vehicle. Moreover, this disclosure is not limited to use with hypersonic vehicles or, for that matter, to use with flight vehicles. For example, any vehicle or other object in which heat can be generated through aerodynamic drag can be used here, or any object that otherwise generates adequate heat or is used in a high-temperature environment can be used here.

As shown in FIG. 1, the flight vehicle 100 includes a body 102, which generally surrounds other components of the flight vehicle 100. The body 102 can have any suitable size, shape, and dimensions. In a hypersonic flight vehicle, for example, the body 102 has a highly aerodynamic shape that enables the flight vehicle 100 to travel through the atmosphere at extremely high rates of speed. Of course, the design for the body 102 can vary widely based on the intended application. The body 102 can also be formed from any suitable material(s). Depending on the application and the environment in which the body 102 will be used, the body 102 can be formed from exotic materials that have extremely high temperature resistances. However, this is not required, and the body 102 can be formed from more conventional materials that can still withstand the expected temperatures for a given application. In addition, the body 102 can be formed in any suitable manner.

The flight vehicle 100 also includes at least one thermal battery 104. Each thermal battery 104 generally includes one or more battery cells, where each battery cell includes an electrolyte that remains in a solid state until the battery cell is activated. As described in more detail below, external heat (such as heat generated on the body 102 of the flight vehicle 100 by aerodynamic drag) can be conducted into the battery cells of the thermal battery 104, melting the solid electrolyte. The melted electrolyte is positioned between anode and cathode layers of each battery cell (which may or may not themselves be melted), allowing electrical energy to be stored in or released from the thermal battery 104. The thermal battery 104 also includes or is used in conjunction with a phase change material, which conducts the external heat into the thermal battery 104. Once the phase change material melts or otherwise changes phase, less or no external heat is conducted into the thermal battery 104.

Each battery cell of a thermal battery 104 can be used to provide any suitable amount of electrical energy, and each thermal battery 104 can include any suitable number of battery cells to provide a desired total amount of electrical energy. The electrical energy provided by each battery cell can vary based on a number of factors, such as the electrochemical design of the battery cell and the size of the battery cell. In particular embodiments, each battery cell can provide about 1.7 volts. The number of battery cells in a thermal battery 104 can also vary based on a number of factors, such as the total amount of electrical energy to be provided by the thermal battery 104. In particular embodiments, eighteen battery cells can be coupled in series in a thermal battery 104 to provide a total output voltage of about thirty volts from the thermal battery 104 (assuming each cell provides about 1.7 volts). Note, however, that the specific voltages provided above are for illustration only, and each battery cell and each thermal battery 104 can provide any other suitable voltage.

Each battery cell of a thermal battery 104 can use any suitable electrochemical design that allows electrical energy to be stored or released once at least the solid electrolyte melts. For example, in some embodiments, the thermal battery 104 can represent a molten salt battery in which at least an electrolytic salt is melted to activate the thermal battery 104. Various types of molten salt battery chemistries can be used in a thermal battery 104, including liquid-metal battery chemistries. Note, however, that other materials can also be used in the thermal battery 104. Additional details regarding example embodiments of a thermal battery 104 are provided below.

In this example, the thermal battery 104 is used to supply electrical energy to electrical circuitry 106. The electrical circuitry 106 can be used to perform any suitable functionality, depending on the application in which the thermal battery 104 is used. For example, in a flight vehicle 100, the electrical circuitry 106 can be used for aiming or targeting, target tracking, triggering, or other functions. In other types of vehicles, the electrical circuitry 106 can be used to perform functions related to operation of the other types of vehicles. In non-vehicle designs, the electrical circuitry 106 can be used to perform other functions.

Optionally, the flight vehicle 100 may include (or be used in a larger system that includes) at least one additional power supply 108 and additional electrical circuitry 110. The power supply 108 can represent any suitable source of electrical energy and may or may not include one or more thermal batteries. For instance, the power supply 108 may include one or more conventional solid-state batteries or other conventional power supplies. The additional electrical circuitry 110 can be used to perform any desired functionality in or related to the flight vehicle 100 (or other system). This approach may allow, for example, electrical power to be supplied to the additional electrical circuitry 110 without requiring external heat to be conducted into the power supply 108. As a result, in some embodiments, the power supply 108 and the additional electrical circuitry 110 can be used to perform various functions prior to use of the thermal battery 104 and the electrical circuitry 106. Note, however, that the power supply 108 and the additional electrical circuitry 110 can be omitted or used in any other suitable manner if desired.

Although FIG. 1 illustrates one example of a flight vehicle 100, various changes may be made to FIG. 1. For example, any other suitable systems can include one or more thermal batteries 104 that are activated using external heat. Other example applications in which one or more thermal batteries 104 can be used include downhole well drilling applications. Also, there is no requirement that the external heat be generated by devices or systems containing the thermal batteries 104, and the external heat can come from any suitable source(s) or cause(s).

Figure 2:
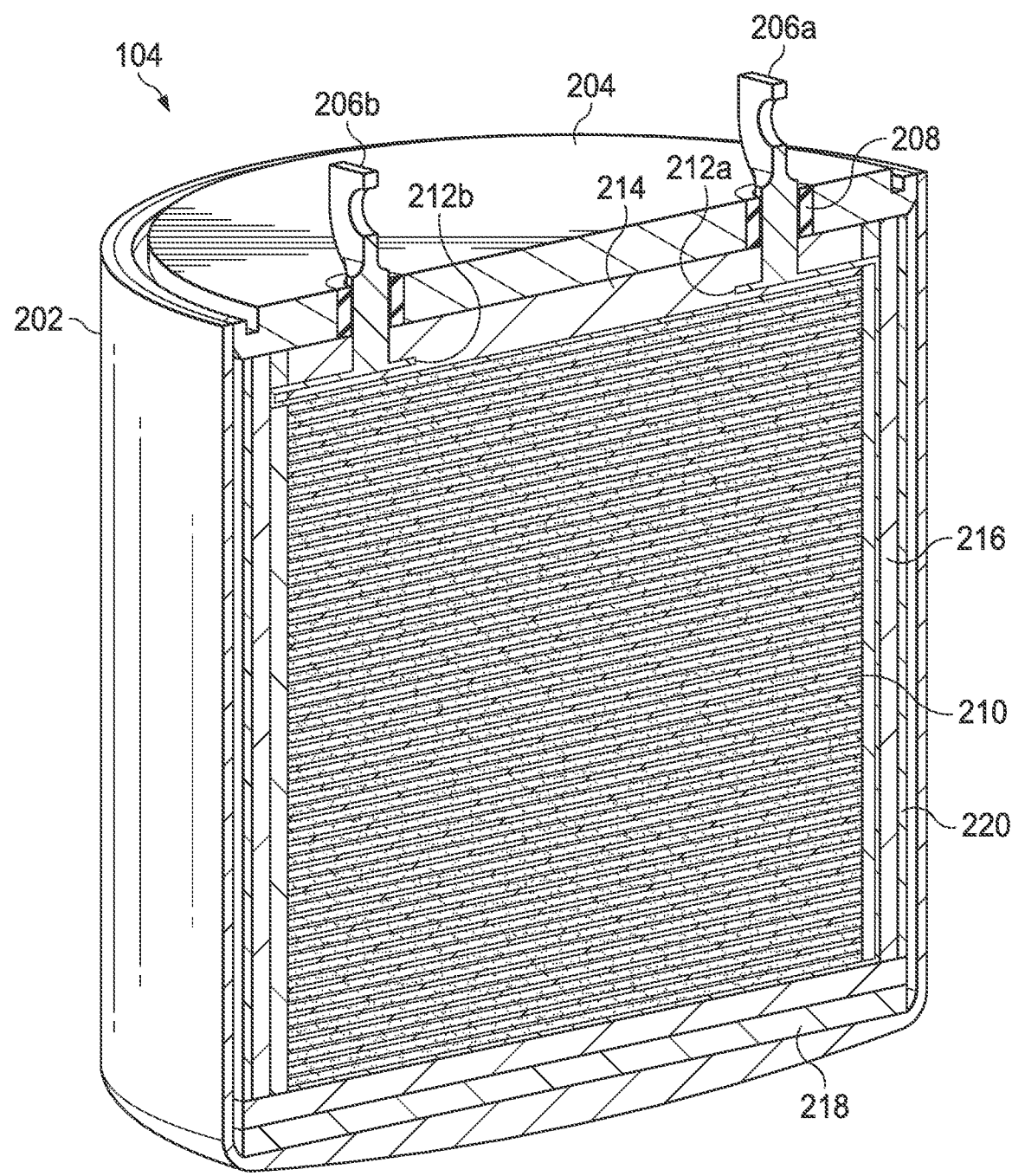
FIG. 2 illustrates an example lightweight thermal battery for high-temperature environments in accordance with this disclosure.

FIG. 2 illustrates an example lightweight thermal battery 104 for high-temperature environments in accordance with this disclosure. In particular, FIG. 2 illustrates a cross-section of an example thermal battery 104. For ease of explanation, the thermal battery 104 may be described as being used in the flight vehicle 100 of FIG. 1. However, the thermal battery 104 can be used in any other suitable device or system in which external heat is used to activate the thermal battery 104.

As shown in FIG. 2, the thermal battery 104 includes a housing 202, which surrounds or otherwise holds other components of the thermal battery 104. The housing 202 can be formed from any suitable material(s), such as one or more metals. The housing 202 can also be formed in any suitable manner. In addition, the housing 202 can have any suitable size, shape, and dimensions. In this example, the housing 202 is generally cylindrical, although other shapes for the housing 202 can be used.

A header 204 is positioned at and connected to one end of the housing 202. The header 204 represents a portion of the thermal battery 104 that can be attached to the housing 202 after other components of the thermal battery 104 have been inserted into the interior space of the housing 202. The header 204 can be formed from any suitable material(s), such as one or more metals. The header 204 can also be formed in any suitable manner. In addition, the header 204 can have any suitable size, shape, and dimensions. In this example, the header 204 is generally circular, although other shapes for the header 204 can be used.

Two power terminals 206a-206b extend through the header 204 and are electrically coupled to other components within the thermal battery 104. The power terminals 206a-206b allow an electrical current to flow through the thermal battery 104, thereby allowing electrical energy to be stored in or released from the thermal battery 104. Each power terminal 206a-206b includes any suitable structure configured to electrically couple a thermal battery to one or more external components. Each power terminal 206a-206b can be formed from any suitable material(s), such as one or more metals. Each power terminal 206a-206b can also be formed in any suitable manner. In addition, each power terminal 206a-206b can have any suitable size, shape, and dimensions. In this example, each power terminal 206a-206b includes a flat top, curved sides, and an interior hole. However, each power terminal 206a-206b can have any other suitable form factor.

A seal 208 surrounds each power terminal 206a-206b as the power terminal 206a-206b passes through the header 204. The seals 208 help to hold the power terminals 206a-206b in place within the header 204. The seals 208 can also help to prevent material from entering into the interior of the thermal battery 104 or from escaping from the thermal battery 104. Each seal 208 represents any suitable structure configured to provide a seal around a power terminal, such as a glass seal. Each seal 208 can also be formed in any suitable manner. In addition, each seal 208 can have any suitable size, shape, and dimensions, which can be determined (at least in part) on the size and shape of the power terminals 206a-206b and of the openings in the header 204.

One or more battery cells 210 are positioned within the interior space of the housing 202. Each battery cell 210 generally includes an anode layer, a cathode layer, and a solid electrolytic material. At least the solid electrolytic material (and possibly the anode and cathode layers) can be melted via external heating to activate each battery cell 210. Each battery cell 210 when activated can provide any suitable electrical energy, such as 1.7 volts or other voltage. In this example, the battery cells 210 are arranged serially in a stacked manner, meaning the voltages provided by the battery cells 210 are summed to produce a larger output voltage. However, it should be noted that the thermal battery 104 can include any suitable arrangement of battery cells 210, including serial and/or parallel arrangements of battery cells 210. Additional details regarding example embodiments of a battery cell 210 are provided below.

The power terminals 206a-206b are electrically coupled to the battery cells 210 via electrical connections 212a-212b. More specifically, the electrical connection 212a couples the power terminal 206a to the anode of the top battery cell 210 in FIG. 2, and the electrical connection 212b couples the power terminal 206b to the cathode of the bottom battery cell 210 in FIG. 2. This allows electrical current to flow through the entire stack of series-connected battery cells 210 in order to store electrical energy in or release electrical energy from the battery cells 210. Of course, other or additional connections can be used if a different serial and/or parallel arrangement of battery cells 210 is used in the thermal battery 104. Each electrical connection 212a-212b includes any suitable conductive pathway configured to transport electrical current to or from one or more battery cells. Each electrical connection 212a-212b can, for example, represent a conductive electrical trace or wire.

The battery cells 210 in this example are encased within an encapsulation layer 214, one or more sidewalls 216, and one or more bottom surfaces 218. The encapsulation layer 214 generally represents a layer of material that can be formed or otherwise placed over the battery cells 210. In some embodiments, the encapsulation layer 214 can be formed over the battery cells 210 in order to encase or otherwise protect at least parts of the electrical connections 212a-212b. The encapsulation layer 214 can be formed from any suitable material(s), such as a resin or other material that can withstand elevated temperatures. The encapsulation layer 214 can also be formed in any suitable manner. In some embodiments, the encapsulation layer 214 can be formed by injecting material through one or more of the holes in the header 204 prior to attachment of the power terminals 206a-206b and formation of the seals 208. However, the encapsulation layer 214 can be formed in any other suitable manner.

The sidewalls 216 and bottom surfaces 218 can represent metal or other surfaces that can be coupled together or contact one another, and the sidewalls 216 can represent metal or other surfaces that can be coupled to or contact the header 204 to define the interior space in which the battery cells 210 are positioned. The sidewalls 216 and bottom surfaces 218 can be formed from any suitable material(s), such as one or more metals. The sidewalls 216 and bottom surfaces 218 can also be formed in any suitable manner. In addition, the sidewalls 216 and bottom surfaces 218 can have any suitable sizes, shapes, and dimensions. In this example, the sidewalls 216 are generally cylindrical and the bottom surfaces 218 are generally circular, although other shapes can be used.

An electrical insulator 220 can be used around at least a portion of the battery cells 210. The electrical insulator 220 helps to electrically isolate the battery cells 210 from external components except via the power terminals 206a-206b and the electrical connections 212a-212b. The electrical insulator 220 can be formed from any suitable dielectric or other electrically-insulative material(s). The electrical insulator 220 can also be formed in any suitable manner. In addition, the electrical insulator 220 can have any suitable size, shape, and dimensions.

Although FIG. 2 illustrates one example of a lightweight thermal battery 104 for high-temperature environments, various changes may be made to FIG. 2. For example, the thermal battery 104 can have any other suitable form factor and include any suitable number of battery cells 210. The thermal battery 104 can also be used in any suitable high-temperature environment.

Figure 3:
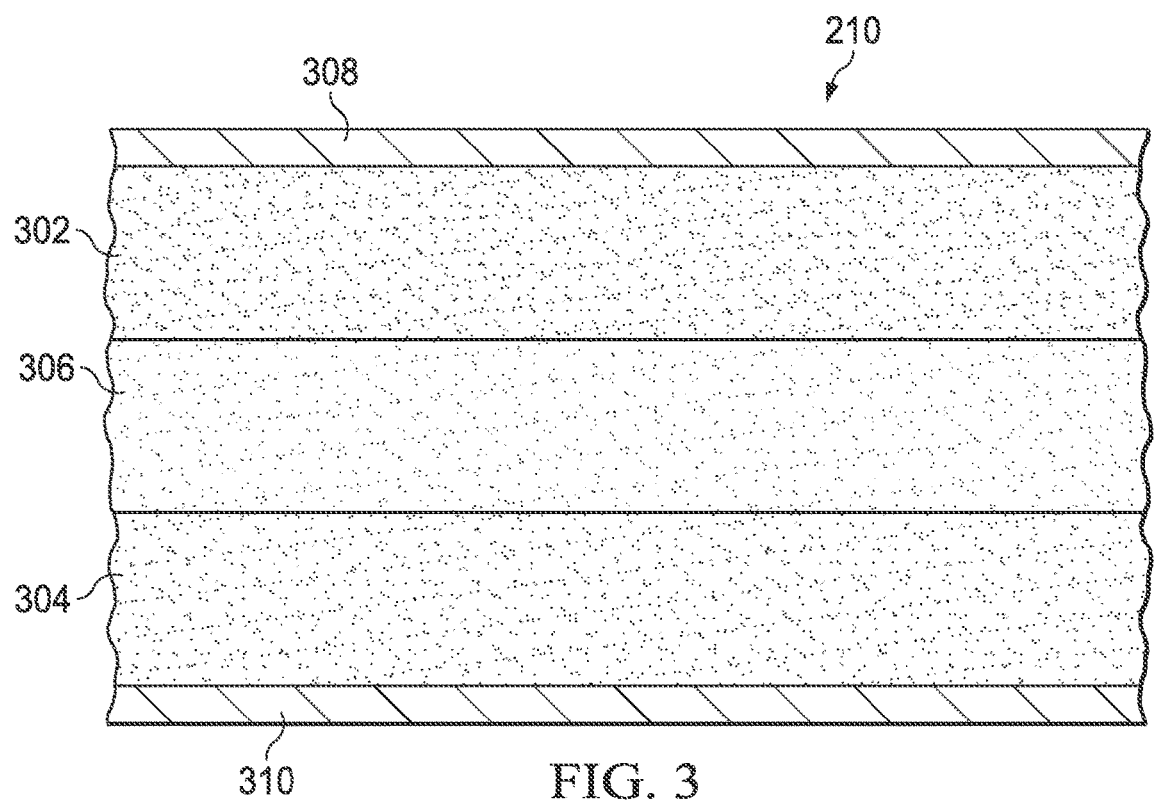
FIG. 3 illustrates an example battery cell in a lightweight thermal battery for high-temperature environments in accordance with this disclosure.

FIG. 3 illustrates an example battery cell 210 in a lightweight thermal battery 104 for high-temperature environments in accordance with this disclosure. For ease of explanation, the battery cell 210 may be described as being used in the thermal battery 104 of FIG. 2, which can be used in the flight vehicle 100 of FIG. 1. However, the battery cell 210 can be used in any other suitable thermal battery and in any other suitable device or system in which external heat is used to activate the battery cell 210.

As shown in FIG. 3, the battery cell 210 includes an anode layer 302 and a cathode layer 304, which are separated by an electrolyte layer 306. When supplying power (meaning the battery cell 210 is being discharged), the anode layer 302 generally represents the negatively-charged electrode of the battery cell 210 and supplies electrons, while the cathode layer 304 generally represents the positively-charged electrode of the battery cell 210 and receives electrons. Note, however, that the designation of the anode and cathode layers 302-304 can be reversed if the battery cell 210 is being charged. When the battery cell 210 is active, the electrolyte layer 306 is used to transport ions between the cathode layer 304 and the anode layer 302, and the electrolyte layer 306 is ionically conductive but not electronically conductive. This allows electrical current to be provided from the battery cell 210 to one or more external components.

The anode layer 302, cathode layer 304, and electrolyte layer 306 can each be formed from any suitable material or materials. There are a number of battery chemistries that can be used in the battery cell 210 to support the desired operation of the battery cell 210. In some embodiments, the battery cell 210 includes an alkali or alkaline earth metal anode layer 302, a metal salt cathode layer 304, and a salt electrolyte layer 306. As particular examples, the anode layer 302 can include calcium, magnesium, or lithium or potassium alloy (such as lithium silicon or lithium aluminum). The cathode layer 304 can include vanadium, calcium chromate, potassium chromate, potassium dichromate, lead chromate, metal oxide, or metal sulfide (such as iron disulfide or cobalt disulfide). The electrolyte layer 306 can include lithium chloride, potassium chloride, lithium bromide, potassium bromide, lithium fluoride, or other halide salt.

The anode layer 302, cathode layer 304, and electrolyte layer 306 can also each be formed in any suitable manner. In some embodiments, each of one or more of the layers 302-306 can be formed using a pressed powder, which can be formed into the shape of a disc or other shape. External heat can be used to melt the pressed powder and activate the battery cell 210. Note, however, that the use of a pressed powder is one example and that each of the layers 302-306 can be formed in any suitable manner.

In some embodiments, all three of the layers 302-306 can be formed from materials that melt to activate the battery cell 210. In these embodiments, the melted materials separate due to their different densities and the immiscibility of the materials forming the anode, cathode, and electrolyte layers 302-306. The melted materials therefore form an active battery cell that can be used to store or release electrical energy. In other embodiments, only the electrolyte layer 306 may melt, while the anode and cathode layers 302-304 are formed as solid layers of materials. In those embodiments, the electrolyte layer 306 can melt when adequate heat is applied, forming an active battery cell. Any other individual layer or combination of layers can be formed using materials that are melted in order to activate the battery cell 210. Once the battery cell 210 is activated by melting at least the electrolyte layer 306, the battery cell 210 can be used until the battery cell 210 is depleted (if the battery cell 210 is supplying electrical energy) or until the electrolyte layer 306 re-solidifies.

The temperature needed to activate the battery cell 210 can vary based on a number of factors, such as the structural design of the battery cell 210 and the material or materials to be melted (at least the electrolyte layer 306). In some embodiments, the electrolyte layer 306 can remain in a solid state until heated to a temperature of at least 662° F. (about 350° C.) to about 1,202° F. (about 650° C.). However, these temperatures are examples only, and other temperatures can be used to melt at least the electrolyte layer 306 (and possibly the anode layer 302 or the cathode layer 304) to activate the battery cell 210.

A current collector layer 308 may optionally be positioned on the anode layer 302, and a current collector layer 310 may optionally be positioned on the cathode layer 304. The current collector layers 308-310 can be used to help reduce interfacial resistance with the battery cell 210 or to perform other functions in the battery cell 210. Each of the current collector layers 308-310 includes any suitable material(s) for facilitating use of a battery cell, such as one or more metals, graphite, or carbon nanotubes.

Although FIG. 3 illustrates one example of a battery cell 210 in a lightweight thermal battery 104 for high-temperature environments, various changes may be made to FIG. 3. For example, the relative sizes of the layers 302-306 are for illustration only. Each layer 302-306 can have any suitable size, and the layers 302-306 need not have the same size. Also, the size and shape of the battery cell 210 itself can be modified as needed or desired.

Figures 4A, 4B:
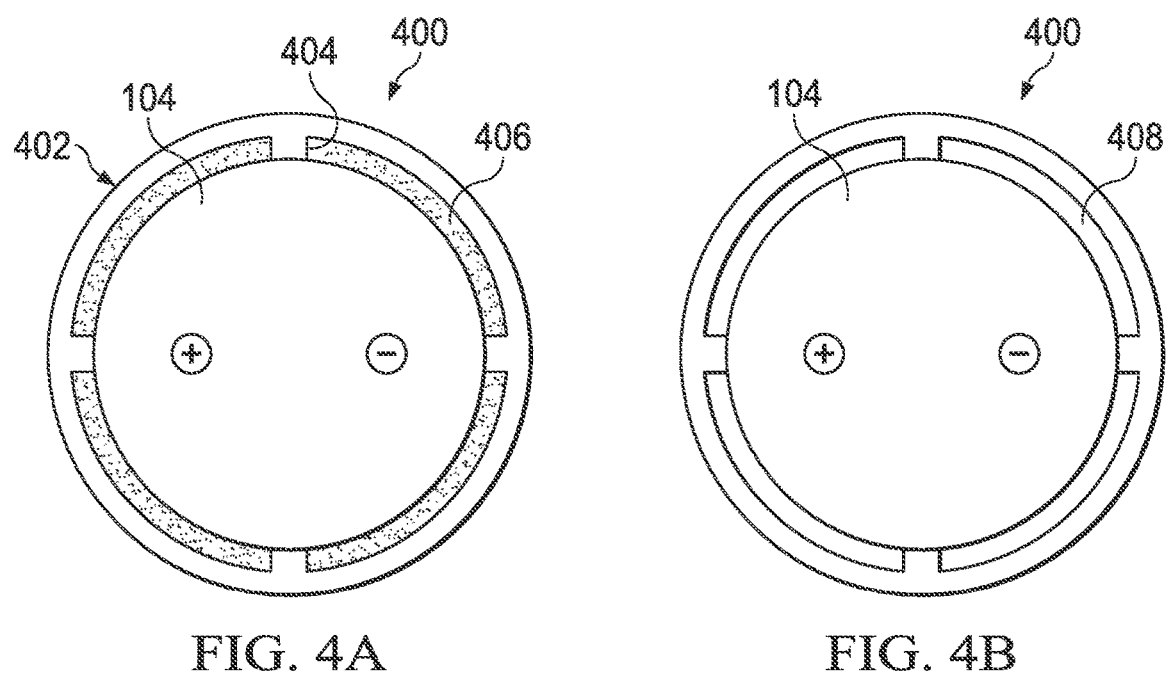
FIGS. 4A and 4B illustrate an example frame used to hold a lightweight thermal battery for high-temperature environments in accordance with this disclosure.

FIGS. 4A and 4B illustrate an example frame 400 used to hold a lightweight thermal battery 104 for high-temperature environments in accordance with this disclosure. For ease of explanation, the frame 400 may be described as being used with the thermal battery 104 of FIG. 2, which can be used in the flight vehicle 100 of FIG. 1. However, the frame 400 can be used with any other suitable thermal battery and in any other suitable device or system in which external heat is used to activate the thermal battery.

As shown in FIGS. 4A and 4B, the frame 400 includes an outer hub 402 and projections 404 extending inward from the outer hub 402. The outer hub 402 can therefore be separated from the thermal battery 104 except in locations where the projections 404 contact the thermal battery 104. The frame 400 generally operates to hold the thermal battery 104 in place and to receive external heat that is conducted into the thermal battery 104. The frame 400 can be formed from any suitable thermally-conductive material(s), such as one or more metals. Note, however, that the outer hub 402 and the projections 404 can also be formed from different materials, such as when the outer hub 402 is formed using one or more thermally-conductive materials and the projections 404 are formed from one or more thermally-insulative materials. The frame 400 can also be formed in any suitable manner. In addition, the frame 400 can have any suitable size, shape, and dimensions. In this example, the outer hub 402 is generally cylindrical in order to surround a cylindrical thermal battery 104, although other shapes can also be used. In some embodiments, the frame 400 is a discrete component that can be coupled to a flight vehicle 100 or other system in order to secure the thermal battery 104 in place. In other embodiments, the frame 400 represents a portion of the flight vehicle 100 or other system in which the thermal battery 104 is placed.

As shown in FIG. 4A, a phase change material 406 is positioned between the outer hub 402 and the thermal battery 104. The phase change material 406 is thermally conductive and helps to conduct external heat into the thermal battery 104. This enables the thermal battery 104 to be heated to an operational temperature, meaning the electrolyte layer 306 (and optionally the anode and cathode layers 302-304) can melt. The phase change material 406 can also change phase (such as by melting) once the phase change material 406 reaches a desired temperature or temperature range. Once the phase change material 406 changes phase, the phase change material 406 moves away from the thermal battery 104. As shown in FIG. 4B, this leaves one or more open spaces 408 between the outer hub 402 and the thermal battery 104. The movement of the phase change material 406 away from the thermal battery 104 significantly interrupts the conduction of the external heat into the thermal battery 104. While some heat may still flow into the thermal battery 104 through the frame 400, the lack of the phase change material 406 can prevent the thermal battery 104 from being heated above the safe operating temperature(s) of active materials in the thermal battery 104.

The phase change material 406 can be formed from any suitable thermally-conductive material(s), such as one or more metals or waxes. The phase change material 406 can, for example, have a melting point at or above the operational temperature of the thermal battery 104 but within one or more safe operating temperature ranges of active materials in the thermal battery 104. In some embodiments, the phase change material 406 can be formed from tin, antimony, or zinc. Of course, any other suitable material or materials having a suitable thermal conductivity and phase change temperature can be used.

Although FIGS. 4A and 4B illustrate one example of a frame 400 used to hold a lightweight thermal battery 104 for high-temperature environments, various changes may be made to FIGS. 4A and 4B. For example, the frame 400 and the phase change material 406 can have any other suitable arrangement that allows the phase change material 406 to conduct heat into the thermal battery 104.

Figure 5:
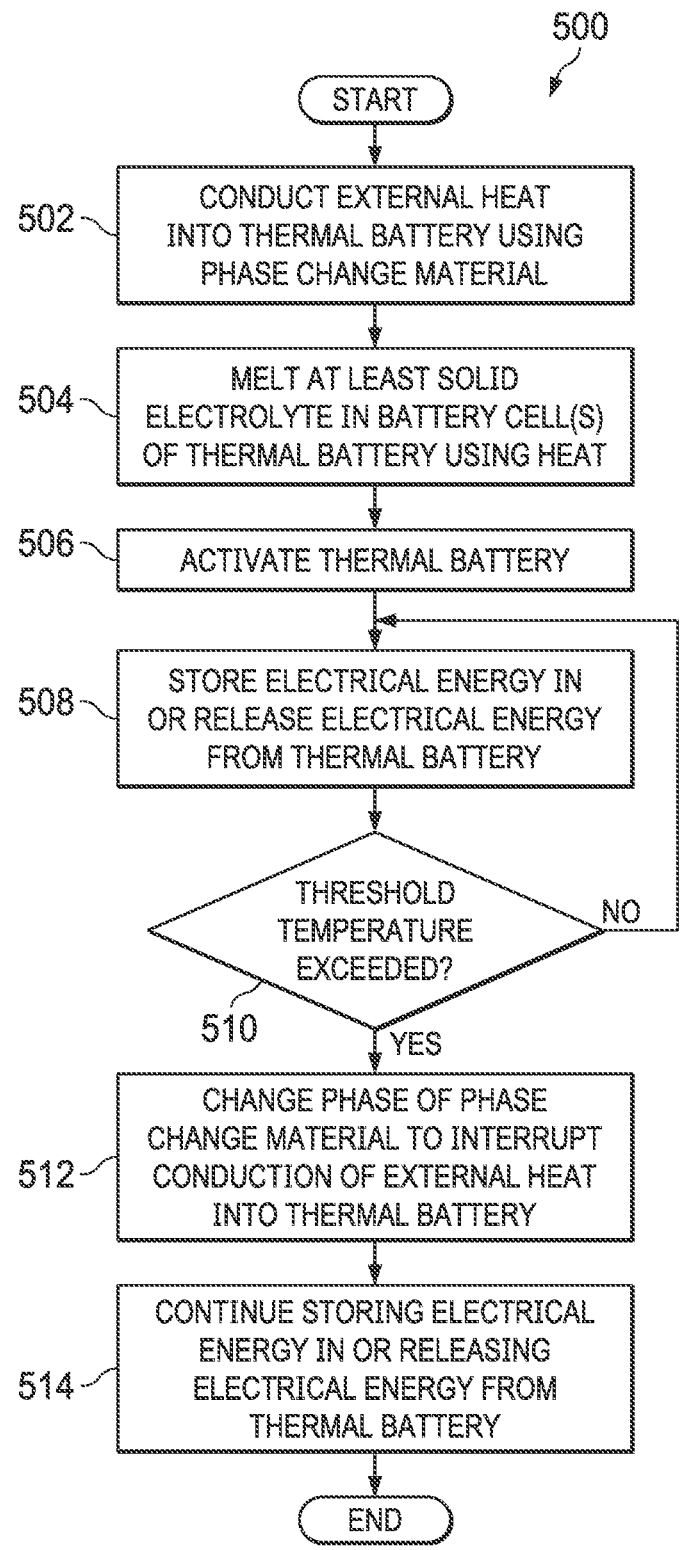
FIG. 5 illustrates an example method for using a lightweight thermal battery in a high-temperature environment in accordance with this disclosure.

FIG. 5 illustrates an example method 500 for using a lightweight thermal battery in a high-temperature environment in accordance with this disclosure. For ease of explanation, the method 500 may be described as being used with the thermal battery 104 of FIG. 2 and the frame 400 of FIG. 4, which can be used in the flight vehicle 100 of FIG. 1. However, the method 500 can be used with any other suitable thermal battery or frame and in any other suitable device or system in which external heat is used to activate the thermal battery.

As shown in FIG. 5, heat is conducted into a thermal battery using a phase change material at step 502. This can include, for example, heat from aerodynamic drag on a flight vehicle 100 or other source passing through the frame 400 and the phase change material 406 into the thermal battery 104. At least an electrolyte layer in one or more battery cells of the thermal battery melts due to the external heat at step 504. This can include, for example, the external heat melting the electrolyte layer 306 in each battery cell 210 of the thermal battery 104. This may or may not also include melting the anode layer 302 or the cathode layer 304. The melting of at least the electrolyte layer activates the thermal battery at step 506. This can include, for example, activating each battery cell 210 of the thermal battery 104. This allows the thermal battery 104 to store or release electrical energy at step 508. That can include, for example, the thermal battery 104 supplying electrical energy to the electrical circuitry 106. As long as a threshold temperature or temperature range is not exceeded at step 510, the thermal battery can continue to store or release electrical energy. This can include, for example, the phase change material 406 remaining in a solid state so that external heat continues to be conducted into the thermal battery 104.

If the temperature or temperature range is exceeded, the phase of the phase change material changes to (at least substantially) interrupt the conduction of the external heat into the thermal battery at step 512. This can include, for example, the phase change material 406 melting and moving away from the thermal battery 104. This leaves open spaces 408 between the outer hub 402 of the frame 400 and the thermal battery 104, which helps to significantly reduce the transfer of external heat into the thermal battery 104. The thermal battery can continue to store or release electrical energy at step 514. This can include, for example, each battery cell 210 of the thermal battery 104 continuing to store or release electrical energy while remaining within one or more safe operating temperature ranges of active materials in the thermal battery 104.

Although FIG. 5 illustrates one example of a method 500 for using a lightweight thermal battery in a high-temperature environment, various changes may be made to FIG. 5. For example, while shown as a series of steps, various steps in FIG. 5 can overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a frame; and
a thermal battery disposed within the frame, the thermal battery comprising:
a housing; and
one or more battery cells within the housing, each battery cell comprising an anode, a cathode, and an electrolyte, wherein the electrolyte in each battery cell is configured to be in a solid state when the battery cell is inactive; and
a phase change material positioned around at least part of the housing and within at least one space between the frame and the thermal battery when the phase change material is in one phase, the phase change material configured to conduct external heat into the housing in order to melt the electrolyte in each battery cell and activate the battery cell, the phase change material also configured to change phase and move away from the housing once the phase change material changes phase to reduce conduction of the external heat into the housing;
wherein the apparatus is configured such that, after the phase change material changes phase and moves away from the housing, the at least one space is at least partially open.

2. The apparatus of claim 1, wherein the frame is configured to hold the thermal battery, receive the external heat, and provide the external heat to the phase change material.

3. The apparatus of claim 1, wherein the frame comprises:
an outer hub positioned around the thermal battery; and
projections extending inward from the outer hub and contacting the thermal battery;
wherein at least the outer hub is thermally-conductive.

4. The apparatus of claim 1, wherein at least one of the anode and the cathode in each battery cell is configured to be in a solid state when the battery cell is inactive and to melt in order to activate the battery cell.

5. The apparatus of claim 1, wherein:
the thermal battery comprises multiple battery cells;
the battery cells are stacked in the housing; and
the thermal battery further comprises (i) multiple power terminals and (ii) multiple electrical connections coupling the power terminals to different ones of the battery cells.

6. The apparatus of claim 1, wherein the thermal battery further comprises an electrically-insulative layer around at least part of the one or more battery cells.

7. The apparatus of claim 1, wherein:
in each battery cell, the anode comprises an alkali or alkaline earth metal, the cathode comprises a metal salt, and the electrolyte comprises a salt electrolyte; and
the phase change material comprises a metal or a wax.

8. The apparatus of claim 7, wherein the phase change material comprises at least one of: tin, antimony, or zinc.

9. A flight vehicle comprising:
a body configured to generate heat;
a frame; and
a thermal battery disposed within the frame, the thermal battery comprising:
a housing; and
one or more battery cells within the housing, each battery cell comprising an anode, a cathode, and an electrolyte, wherein the electrolyte in each battery cell is configured to be in a solid state when the battery cell is inactive; and
a phase change material positioned around at least part of the housing and within at least one space between the frame and the thermal battery when the phase change material is in one phase, the phase change material configured to conduct the heat from the body into the housing in order to melt the electrolyte in each battery cell and activate the battery cell, the phase change material also configured to change phase and move away from the housing once the phase change material changes phase to reduce conduction of the heat from the body into the housing;
wherein the flight vehicle is configured such that, after the phase change material changes phase and moves away from the housing, the at least one space is at least partially open.

10. The flight vehicle of claim 9, wherein the frame is configured to hold the thermal battery, receive the heat from the body, and provide the heat from the body to the phase change material.

11. The flight vehicle of claim 9, wherein the frame comprises:
an outer hub positioned around the thermal battery; and
projections extending inward from the outer hub and contacting the thermal battery;
wherein at least the outer hub is thermally-conductive.

12. The flight vehicle of claim 9, wherein at least one of the anode and the cathode in each battery cell is configured to be in a solid state when the battery cell is inactive and to melt in order to activate the battery cell.

13. The flight vehicle of claim 9, wherein:
the thermal battery comprises multiple battery cells;
the battery cells are stacked in the housing; and
the thermal battery further comprises (i) multiple power terminals and (ii) multiple electrical connections coupling the power terminals to different ones of the battery cells.

14. The flight vehicle of claim 9, wherein the thermal battery further comprises an electrically-insulative layer around at least part of the one or more battery cells.

15. The flight vehicle of claim 9, wherein:
in each battery cell, the anode comprises an alkali or alkaline earth metal, the cathode comprises a metal salt, and the electrolyte comprises a salt electrolyte; and
the phase change material comprises a metal or a wax.

16. The flight vehicle of claim 9, further comprising:
electrical circuitry that is configured to be powered by the thermal battery.

17. The flight vehicle of claim 16, further comprising:
a power supply that does not include any thermal batteries; and
additional electrical circuitry that is configured to be powered by the power supply.

18. A method comprising:
conducting external heat through a phase change material into a thermal battery, the phase change material positioned around at least part of a housing of the thermal battery and within at least one space between a frame and the thermal battery when the phase change material is in one phase, the thermal battery comprising one or more battery cells within the housing, each battery cell comprising an anode, a cathode, and an electrolyte, wherein the electrolyte in each battery cell is in a solid state when the battery cell is inactive;
melting the electrolyte in each battery cell using the external heat to activate the battery cell; and
changing a phase of the phase change material and moving the phase change material away from the housing once the phase change material changes phase to reduce conduction of the external heat into the housing after the one or more battery cells are activated;
wherein, after the phase change material changes phase and moves away from the housing, the at least one space is at least partially open.

19. The method of claim 18, further comprising:
in each battery cell, melting at least one of the anode and the cathode in order to activate the battery cell.

20. The method of claim 18, further comprising:
maintaining the thermal battery at a safe operating temperature after changing the phase of the phase change material.

* * * * *